United States Patent

Sanders

[15] 3,661,119
[45] May 9, 1972

[54] LARVAE REARING TANK AND CIRCULATION SYSTEM FOR FISH CULTURE

[72] Inventor: Graham Hodge Sanders, Elizabeth City, N.C.

[73] Assignee: Oceanography Mariculture Industries, Inc., Riviera Beach, Fla.

[22] Filed: Sept. 11, 1970

[21] Appl. No.: 71,512

[52] U.S. Cl. ..................................119/3, 119/2
[51] Int. Cl. ..................................A01k 63/00
[58] Field of Search ..................................119/2, 3, 4, 5

[56] References Cited

UNITED STATES PATENTS

| | | | |
|---|---|---|---|
| 151,080 | 5/1874 | Bryan | 119/3 |
| 263,933 | 9/1882 | McDonald | 119/3 |
| 833,418 | 10/1906 | Ruckl | 119/3 |
| 2,594,474 | 4/1952 | McGrath | 119/5 |
| 3,116,712 | 1/1964 | Ogden et al | 119/3 |
| 3,465,718 | 9/1969 | Handman et al | 119/2 |

*Primary Examiner*—Aldrich F. Medbery
*Attorney*—Oblon, Fisher & Spivak

[57] ABSTRACT

A larvae rearing tank and a water circulation and filtration system associated therewith which provides a high rate of water exchange in the larvae tank with minimum turbulence and water flow in the direction of the tank walls, thereby to provide optimum conditions within the tank for insuring survival of the fish larvae therein. The larvae tank includes a granular layer of filtrant material supported in spaced relation from its bottom end, an outlet pipe for discharging water from the bottom end, and an input reservoir for supplying water thereto above the level of the granular filtrant material. The reservoir is embodied in a container of smaller cross-sectional area than the larvae tank which is positioned within the tank and has a plurality of horizontally extending hollow rods which are sealed on the ends thereof and have a plurality of small holes therein through which the water is transferred from the reservoir to the larvae tank with an initial circular flow pattern. Water from the outlet of the larvae tank is pumped to a sump positioned at substantially the same level as the larvae tank, and from there it is pumped through a filter system and discharged into the top of the input reservoir, whereby the input rate of water being delivered to the larvae tank is determined by the pressure head in the input reservoir created by the height of the filtered water therein which, in turn, is controlled by a valved head-relief line leading to the output sump.

8 Claims, 4 Drawing Figures

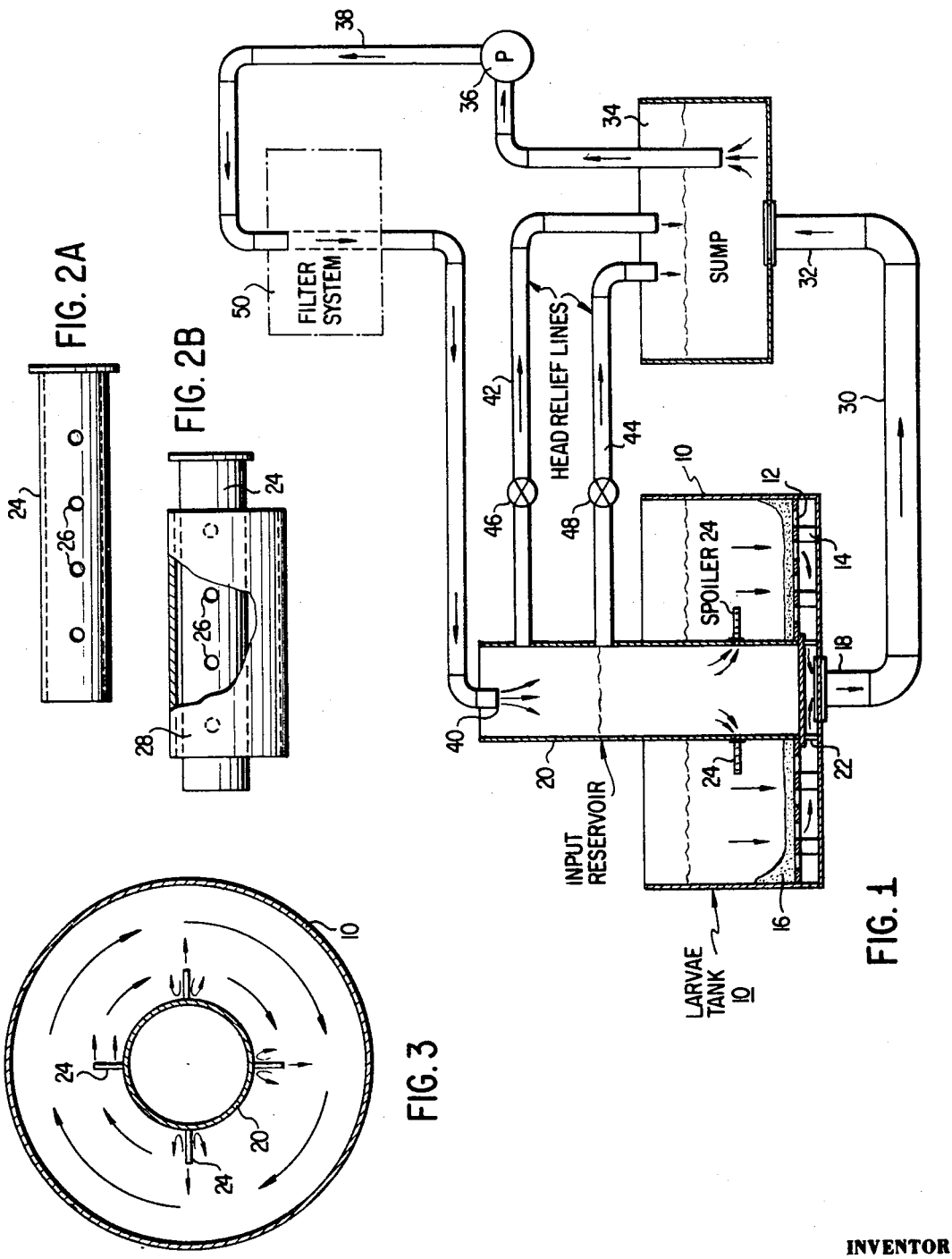

LARVAE REARING TANK AND CIRCULATION SYSTEM FOR FISH CULTURE

BACKGROUND OF THE INVENTION

This invention relates generally to the production and raising of food fish and more particularly concerns a larvae rearing tank and a water circulation and filtration system in combination therewith which provides a rapid exchange of water in the larvae tank while, in order to avoid injuring the larvae and prevent the accumulation of food at the walls of the tank, minimizing turbulence and water flow in the direction of the tank walls.

In commercial "farming" operations of various species of fish, a desirable practice is to conduct different phases of the fish production process in separate tanks so that the environmental conditions most favorable for a specific phase, such as, for example, spawning, incubating, hatching and larvae rearing, and raising, may be conveniently maintained, or provided, in each tank, respectively being based upon the particular phase for which the tank is being utilized. The hatching and larvae rearing phase is perhaps one of the most critical in the production process, especially in the mariculture of pompano and certain other fish, since once the eggs have hatched, the larvae are extremely vulnerable for a given period of time which, in the case of pompano, for example, extends from about 1 or 2 days to about 14 days after hatching.

During this critical period, the larvae must be provided with an adequate and properly distributed food supply, and steps must be taken to avoid any build-up of contaminants, waste materials, and other impurities in the aquatic environment. In a larvae rearing tank, this implies a high rate of water exchange by renewal or by recirculation in a closed cycle utilizing filtration. This rapid rate of turn-over of tank water also must be achieved in a manner that will not be harmful to the larvae. Closed cycle fish tank systems heretofore available are not satisfactory for this purpose, primarily because air bubbles which are likely to be fatal to the larvae if swallowed are usually introduced due to supersaturation in a pumped circulation system. Water movement toward the walls of previous tank systems is another significant problem, since this movement may cause the larvae to be injured and food to accumulate at the walls.

Thus, because of the vulnerable characteristics of the larvae, in order to optimize the larvae survival rate during this particularly vulnerable period, a closed cycle tank system must not only provide a relatively high rate of water exchange by circulation and maintain a high water quality through appropriate filtration, but also must be characterized by minimum turbulence, minimum production of air bubbles, very small pressure gradients at the tank inlet and outlet, and minimal water flow toward the walls of the tank.

SUMMARY OF THE INVENTION

Accordingly, it is an object of the present invention to provide a water circulation and filtration system for providing a high rate of water exchange in a fish larvae rearing tank and for maintaining the water quality therein favorable for rearing the larvae within the tank.

Another object of the present invention is to provide a larvae rearing tank having a water circulation system associated therewith which provides a high rate of water exchange in the larvae tank with minimum turbulence and water flow in the direction of the tank walls.

Still another object of the present invention is to provide a larvae rearing tank with a water circulation system for rapidly exchanging the water in the tank which is characterized by the fact that it produces minimum turbulence and air bubbles.

Yet another object of the present invention is to provide a larvae rearing tank with a water circulation system which produces minimal pressure gradients at the tank inlet and outlet.

The foregoing and other objects are achieved, according to the present invention, by a combination water quality maintenance and circulation system which comprises, in association with the fish larvae rearing tank, a granular layer of filtrant material supported in spaced relation from the bottom end of the tank, an outlet pipe for discharging water from below the filtrant material, a cylindrical container having a smaller diameter than that of the larvae tank and positioned within the larvae tank for supporting an input reservoir of filtered water therein, and a plurality of hollow rods extending horizontally from the input reservoir container which are sealed on the free ends thereof and have therein a plurality of small holes through which the water is delivered from the reservoir to the larvae tank with an initial circular flow pattern. Water from the outlet of the larvae tank is pumped to a sump which is positioned at substantially the same level as the tank, and from there it is pumped through a filter system and discharged into the top of the input reservoir. The input rate of filtered water being delivered to the larvae tank is determined by the pressure head in the input reservoir which is created by the height of the filtered water therein and, in turn, is controlled by a pair of valved head-relief lines leading from the input reservoir container to the output sump.

BRIEF DESCRIPTION OF THE DRAWING

Various other objects, features and further attendant advantages of the present invention will be more readily appreciated as the same becomes better understood from the following detailed description when considered in connection with the accompanying Drawing, wherein like reference numerals are used for designating like or corresponding parts in the several Figures, and in which:

FIG. 1 is a schematic diagram of a larvae rearing tank and a water circulation and filtration system therefor, being shown partly in section, in which the present invention is embodied;

FIG. 2 (A) illustrates one of the hollow rods, or spoilers, which is horizontally disposed within the larvae tank and is connected to the input reservoir for delivering filtered water therein to the larvae tank;

FIG. 2 (B) illustrates the hollow rod shown in FIG. 2(A) having a sleeve fitted thereover for changing the input flow direction of the water being delivered therethrough; and, FIG. 3 is a top view of the larvae tank illustrating the flow patterns of the water being delivered thereinto from the input reservoir and through the hollow rods extending horizontally therefrom.

DETAILED DESCRIPTION OF A PREFERRED EMBODIMENT

Referring now to the drawing, and more particularly to FIG. 1 thereof, there is shown a fish larvae rearing tank 10 which preferably is substantially cylindrical in configuration. Positioned in the bottom of the larvae tank 10 is an annular perforated plate 12 which is supported in spaced relation from the bottom wall of the tank on a plurality of depending crossbars 14. A layer of granular filtration material 16, such as, for example, sand, covers the plate 12 which may, if desired, have a fine mesh screen or similar water-permeable material thereon for permitting water in the larvae tank 10 to pass freely downward through the filtrant material and into the space below the plate member 12 where it may reach an outlet pipe 18 disposed in the bottom of the tank without introducing excessive turbulence or flow patterns which could be harmful to the larvae.

Axially positioned within the larvae tank 10 is a cylindrical container 20 which fits within the central opening in the annular filtrant supporting plate member 12 and is closed at the bottom end thereof, also being spaced from the bottom wall of the larvae tank 10, substantially the same distance as the plate 12, on supporting legs 22. As shown, the outlet pipe 18 is positioned below the cylindrical container 20 and the water in the space below the filtrant material and the supporting plate 12 therefor obviously may circulate freely between the legs 14 supporting the plate 12 and the legs 22 supporting the container 20 to reach the outlet pipe.

The cylindrical container 20 serves as an input reservoir for water which is to be supplied to the larvae tank 10. Accordingly, it is open at its upper end for receiving filtered water from a filter arrangement to be hereinbelow set forth, and is provided with a special outlet means for delivering the filtered water stored therein to the tank in a manner which will essentially prevent movement of the water toward the walls of the tank. This special outlet means comprises a plurality of hollow tubular rod flow controlling devices, or spoilers, 24, being shown as four in number, which extend horizontally from the wall of the cylindrical container 20 and are substantially equally spaced about the circumference thereof, in this case, being at approximate 90° intervals around the base of the reservoir. Each of the tubular spoilers 24 is closed at the end extending into the larvae tank, is open at its other end to the input reservoir 20, and has a plurality of holes 26 equally spaced over its length for delivering filtered water from the reservoir 20 into the larvae tank 10. Although the holes 26 are shown as four in number, it is to be understood, of course, that other numbers might serve equally as well.

Referring now to FIG. 2, there is shown in FIG. 2(A) one of the tubular spoilers 24 by itself and, in FIG. 2(B), one of the tubular spoilers 24 having a loosely fitted sleeve member 28 positioned thereon and surrounding the intermediate portion thereof in which the holes 26 appear. Preferably, three of the tubular spoilers 24 are covered by these loosely fitting sleeves 28 which change the flow direction of the water input to the tank 10, but do not restrict the flow otherwise, and one spoiler 24 is left uncovered to all circular flow thrust. The flow patterns within the input reservoir 20 which result from this arrangement of the network of spoilers 24 is shown in greater detail in FIG. 3, and it may be seen therein that the water is transferred from the reservoir to the larvae tank with an initial circular flow pattern, or with minimal radial flow, whereby it is less likely that the larvae will be carried by the flow patterns to the wall of the tank which might result in injury thereto and, in the same manner, the accumulation of food at the wall of the tank is substantially precluded.

Circulation of water through the system involves a flow path from the outlet pipe 18 in the bottom end of the larvae tank 10, through a conduit 30 and an inlet pipe 32 into a sump 34. From the sump 34, the water is pumped by a pump 36 back to the input reservoir 20 through a line 38 which exits at 40 into the open upper end of the container 20. A pair of pressure head relief lines 42 and 44, respectively, having valve members 46 and 48 therein, connect the inside of the input reservoir 20 with the sump 34. As shown, these lines 42 and 44 are disposed in vertically spaced relation, with the water level in the input reservoir 20 being at the same level as the lower line 44, which permits flow from the reservoir 20 to the sump 34 and thereby maintains a substantially constant pressure head acting from the reservoir 20 and through the spoilers 24 to the larvae tank 10. This arrangement of the input reservoir 20 and the spoiler orifices 26 provides a low-pressure gradient water supply to the tank, driven by the pressure head due to the height of water in the reservoir, and helps to eliminate bubbling due to supersaturation.

In order to prevent the build-up of harmful impurities of waste products in the system, a filter arrangement 50 may be included in the flow line 38 between the output sump 34 and the input reservoir 20. The filter configuration may vary, depending on other characteristics of the system, such as the particular biological entity involved. In an embodiment of the apparatus developed for use with pompano larvae, a filter system has been utilized which involves a vertical array incorporating, from top to bottom, an algae bed for removal of nitrates, a particulate filter, and an activated charcoal filter stage for ammonia removal. Water from the sump 34 is pumped to the filter system 50 and descends under gravity through the filter bank, eventually reaching the input reservoir 20. It is, of course, not essential to the basic concept of the system to rely upon gravity feed through this section, and, in the same sense, it is to be understood that other filters may readily be incorporated into the circulation system of the present invention without departing from the scope of the teachings thereof.

In review, it may be seen that the basic elements of the tank and circulation system therefor are arranged to provide certain beneficial hydrodynamic functions and characteristics which are essential for the survival of the larvae of certain species of fish through a particularly vulnerable period beginning shortly after the eggs of the same have hatched. Thus, the input reservoir 20 and the spoilers 24 provide a low-pressure gradient water supply to the tank, which is driven by the pressure head due to the height of water in the reservoir, to thereby eliminate bubbling due to supersaturation. Also, the dual bypass pipes 42 and 44 provide fine control of the pressure head and consequently of the pressure gradient and flow characteristics in the tank 10, and the spoilers 24 serve to reduce water flow toward the walls of the larvae tank. Another feature is that the layer of granular material 16 in the bottom of the tank 10 allows full cross-section drainage of water from the tank so that high circulation rates can be maintained with a minimum of turbulence, suction, or undesirable pressure gradients.

In combination, these elements and functions constitute a novel hydrodynamic system with certain characteristics which are essential to the successful rearing of certain types of fish larvae in a controlled-closed system.

Although the apparatus is intended to optimize fish larvae survival in a commercial fish farming or mariculture operation, it also can be applied in research activities, biological supply operations, and any operations requiring the maintenance and nurturing of delicate fish larvae.

Obviously, many modifications and variations of the present invention are possible in light of the above teachings. It is to be understood, therefore, that within the scope of the appended claims, the invention may be practiced otherwise than as specifically described herein.

What is claimed is:

1. A circulation and filtration system comprising: a fish larvae rearing tank,
    a sump,
    fluid conduit means connecting the bottom of said larvae rearing tank and said sump,
    a vertically oriented substantially centrally located cylindrical container within said larvae rearing tank,
    means for pumping liquid from said sump into the top of said cylindrical container,
    fluid conduit means connecting said cylindrical container at a predetermined distance from the top thereof with said sump, and,
    means for feeding liquid from said cylindrical container into said larvae rearing tank with an initial circular flow pattern concentric with said container.

2. The apparatus set forth in claim 1, wherein said means for feeding liquid from said cylindrical container into said larvae rearing tank comprises a plurality of horizontally disposed hollow tubular members, each of which is closed at one end and open at the other end into said cylindrical container, and each being further provided with a plurality of holes spaced along its length.

3. The apparatus set forth in claim 2, further including a hollow sleeve member positioned on at least one of said plurality of hollow tubular members.

4. The apparatus set forth in claim 1, further including filter means positioned between said sump and said cylindrical container for filtering liquid being pumped therebetween.

5. Apparatus for use in fish culture comprising:
    a fish larvae rearing tank,
    a layer of granular filtrant material in said tank supported in spaced relation from the bottom end thereof,
    an outlet in the bottom of said tank,
    a sump,
    fluid conduit means connected between said tank outlet and said sump,
    a vertically oriented cylindrical container in and spaced from the side of said tank, a fluid inlet into said cylindrical container, fluid conduit means connected between said cylindrical container fluid inlet and said sump, means for pumping liquid from said sump through said conduit means connecting said cylindrical container inlet and said sump, filter means in said fluid conduit means connecting said cylindrical container inlet and said sump, at least one head relief conduit connecting said cylindrical container and said sump, and, a plurality of hollow tubular members extending horizontally from said cylindrical container into said larvae rearing tank, being open at one end into said cylindrical container and closed at the other end and having a plurality of radial holes therein for delivering liquid from said cylindrical container into said larvae rearing tank with an initial circular flow pattern around said cylindrical container.

6. The apparatus set forth in claim 5, further including valve means in said head relief conduit.

7. The apparatus set forth in claim 5, further including a hollow tubular sleeve positioned on at least one of said plurality of horizontally extending tubular rods.

8. A method of providing a continuous liquid flow in a fish tank comprising the steps of:

maintaining a reservoir of filtered liquid for supplying liquid to said tank, feeding liquid into the tank from said reservoir in a circular flow pattern around said reservoir, Adjusting the rate of feeding by adjusting the pressure head in said reservoir, removing liquid from the bottom of said tank and returning the same to said reservoir, and, filtering the liquid after removing it from said tank and before returning it to the reservoir.

* * * * *